Oct. 31, 1939.  D. W. RIPLEY  2,177,997
AUTOMATIC WEIGHING APPARATUS
Filed Sept. 24, 1937  4 Sheets-Sheet 2
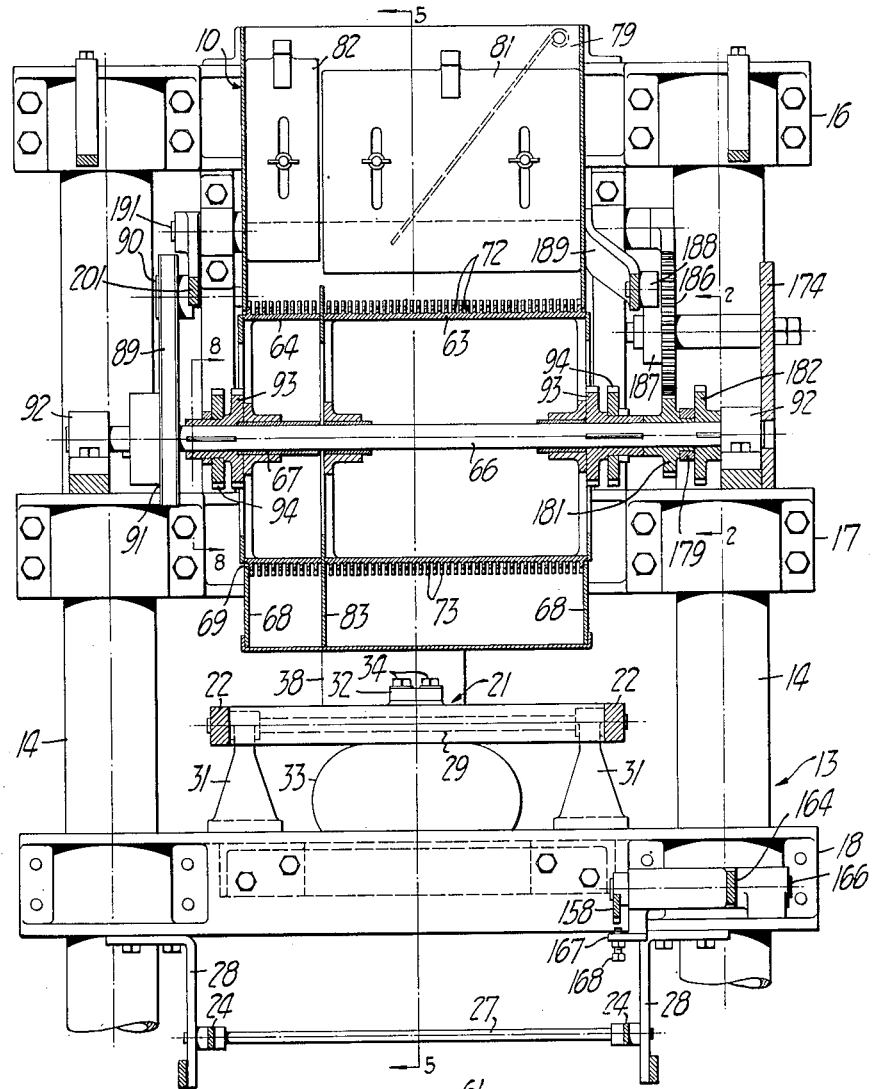
FIG_3_
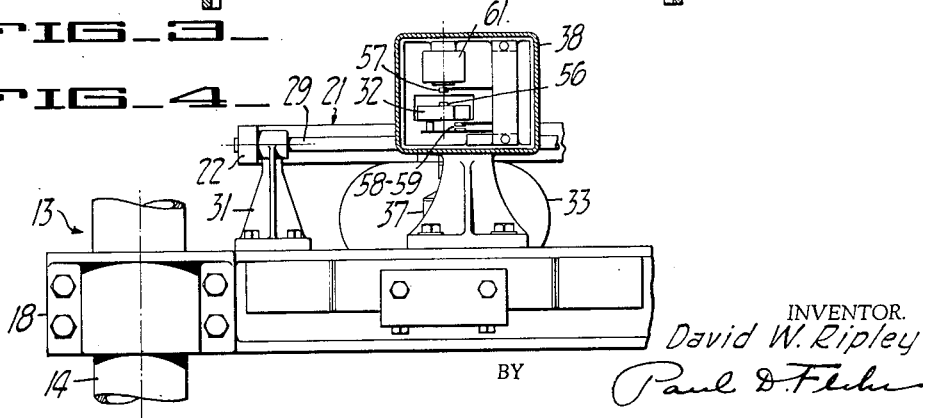
FIG_4_
INVENTOR.
David W. Ripley
BY
Paul D. Fisher
ATTORNEY.

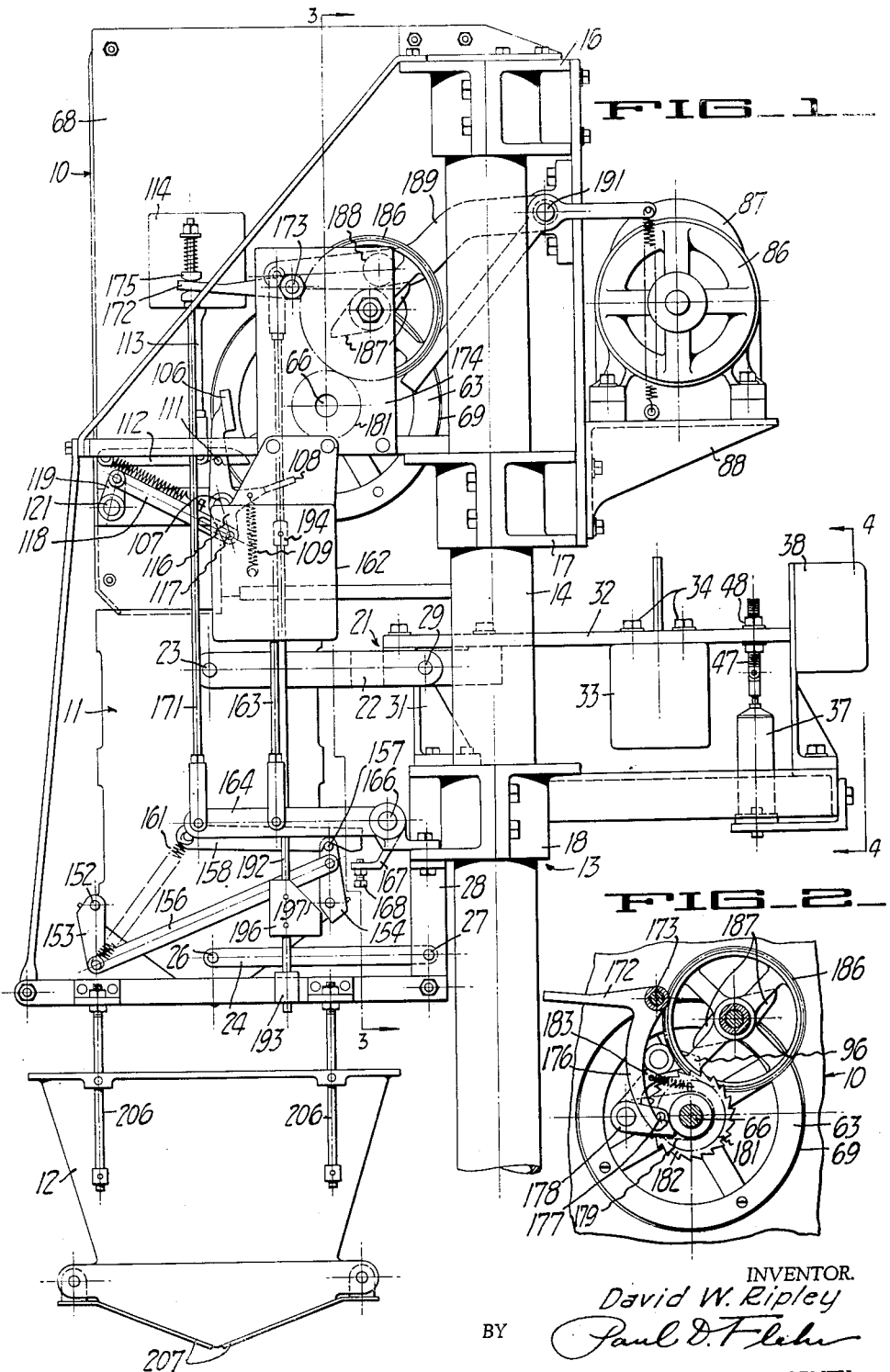

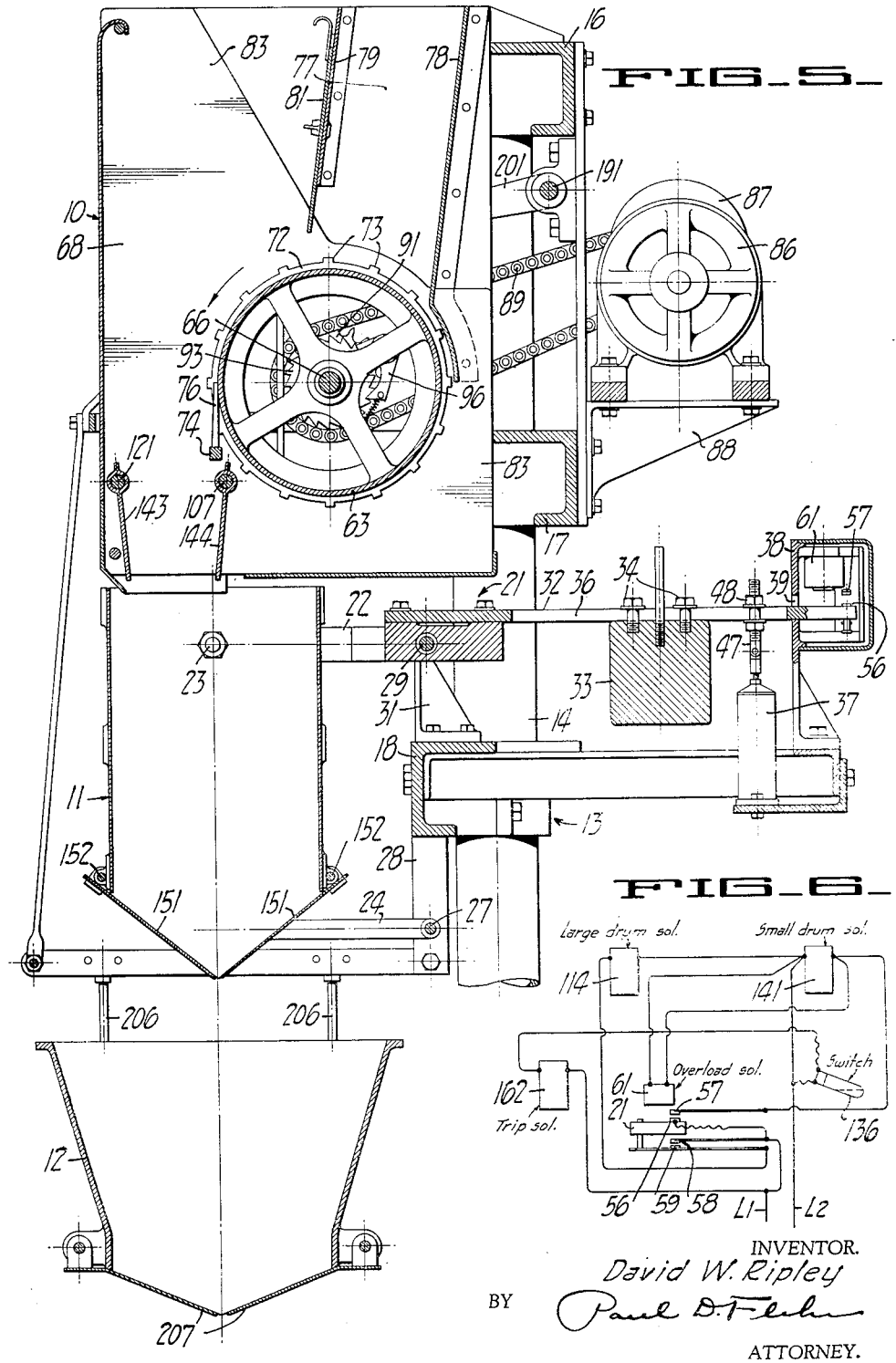

Oct. 31, 1939.  D. W. RIPLEY  2,177,997
AUTOMATIC WEIGHING APPARATUS
Filed Sept. 24, 1937  4 Sheets-Sheet 4
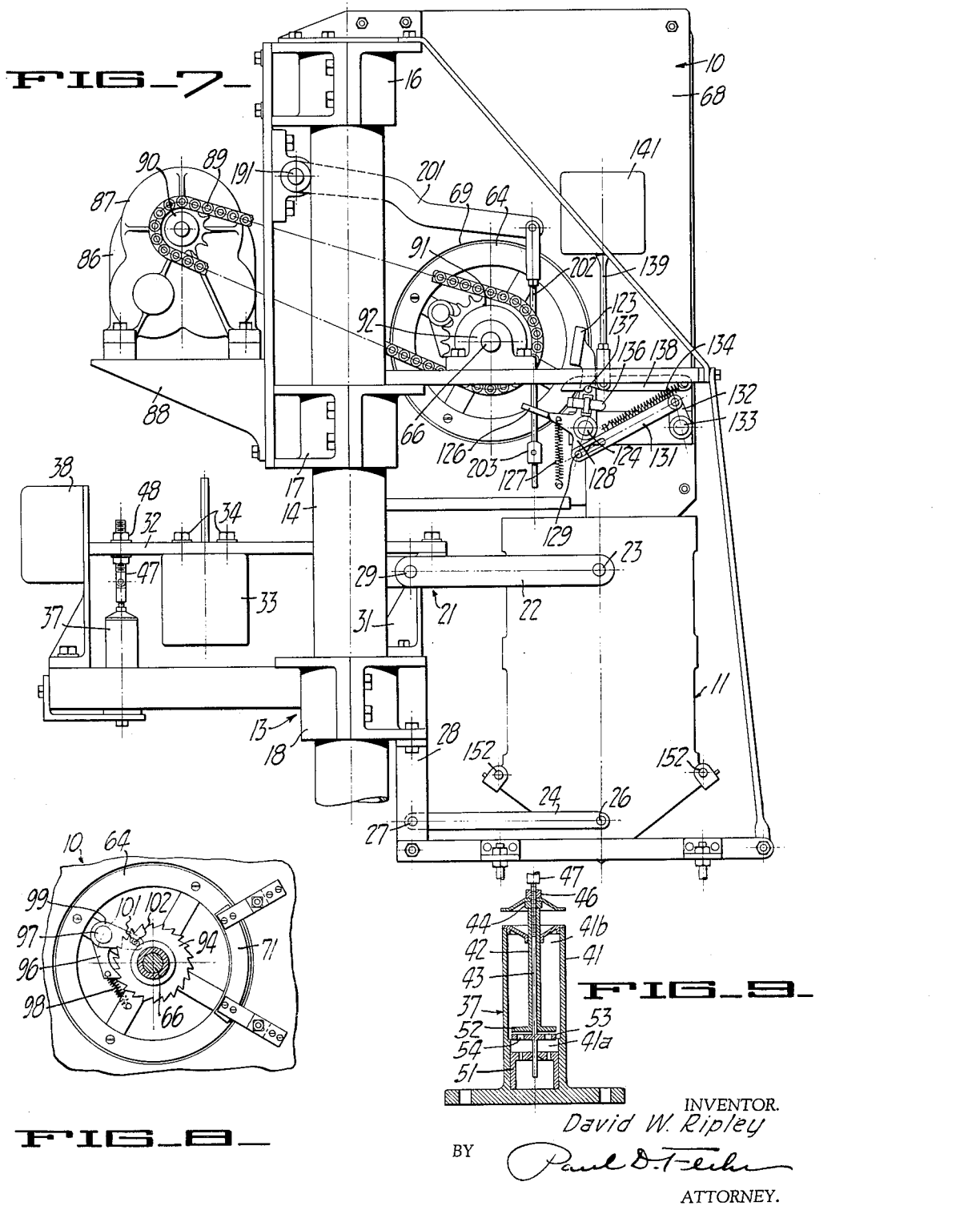
INVENTOR.
David W. Ripley
BY
ATTORNEY.

Patented Oct. 31, 1939

2,177,997

UNITED STATES PATENT OFFICE 2,177,997

AUTOMATIC WEIGHING APPARATUS

David W. Ripley, Oakland, Calif., assignor of one-half to Alfred M. Blumer, Hillsborough, Calif.

Application September 24, 1937, Serial No. 165,518

4 Claims. (Cl. 249—42)

This invention relates generally to automatic equipment for weighing predetermined quantities of a bulk material. The machine as disclosed herein has found successful application in the dried fruit industry, for weighing out measured quantities of dried fruit like prunes or raisins for packaging.

It is an object of the invention to provide a machine of the above character which will have a high degree of accuracy as compared to machines previously available. The accuracy of my machine is attributed to a number of different factors, including particularly however the manner in which electrical contact is established to effect final shut-off of material being supplied to the weighing hopper.

It is a further object of the invention to provide an improved automatic weighing machine having both a large main feed drum and a small dribble feed drum, together with a type of electrical control for the same which will insure a high degree of accuracy. The control mechanism is characterized by the use of two pairs of electrical contacts, associated with the weighing or balancing beam for the weighing hopper, together with damping means constructed in such a manner that one pair of contacts is retained positively closed, without chattering movement, until after the beam starts to swing in a direction to close the other pair of contacts. For intermediate positions of the weighing beam and positions immediately preceding closing of the second pair of contacts, the beam is substantially undamped.

Another object of the invention is to provide novel mechanism elements for carrying out cyclic operation of different parts of the automatic weighing machine, together with novel means for re-setting various mechanisms after they have been actuated.

Further objects of the invention will appear from the following description in which the preferred embodiment of the invention has been set forth in detail in conjunction with the accompanying drawings.

Referring to the drawings:

Fig. 1 is a side elevational view, illustrating a machine incorporating the present invention.

Fig. 2 is a detail showing portions of the one revolution clutch for cycling the machine after a weighing operation, and which parts are hidden from view in Fig. 1.

Fig. 3 is a cross-sectional view taken along the line 3—3 of Fig. 1.

Fig. 4 is a cross-sectional detail, taken along the line 4—4 of Fig. 1.

Fig. 5 is a cross-sectional view taken along the line 5—5 of Fig. 3.

Fig. 6 is a circuit diagram showing the electrical connections between the various tripping solenoids, the recycling switch, and the electrical contacts operated by the balancing beam.

Fig. 7 is a side elevational view showing the main parts of the machine, and looking towards the opposite side of the machine, from that illustrated in Fig. 1.

Fig. 8 is a detail illustrating the ratchet mechanism associated with the dribble feed drum, and which is hidden from view in Fig. 7.

Fig. 9 is a cross-sectional detail illustrating the damping solenoid connected to the balancing beam.

Referring first to Fig. 1 of the drawings, the machine illustrated consists generally of an upper housing 10, with which certain working parts are associated, including particularly the large and small feed drums. Immediately below the housing 10 there is a weighing hopper 11, and below the hopper 11 there is a receiving hopper 12, for delivering the material being weighed to cartons or receptacles. The parts just mentioned together with the other working parts, are carried by a suitable support 13, which includes the uprights 14, together with the cross members 16, 17 and 18 (Fig. 3).

The hopper 11 performs the main weighing operation, and it is mounted for limited vertical movement. Thus a balancing beam 21 is provided, which includes the spaced arms 22, extending forwardly upon opposite sides of the hopper 11. The forward ends of these arms have fulcrum connections 23, with the side walls of the hopper 11, at points near the upper portion of this hopper. The lower portion of the hopper is steadied against swinging movement, by the spaced links 24, the forward ends of which have pivotal connections 26 with the lower portion of the hopper. The rear ends of the links have pivotal connections 27, with the depending stationary bracket 28. Balancing beam 21 has a fulcrum mounting 29 to brackets 31, which are carried by the framing member 18. The rearwardly extending arm 32 of the beam 21 carries a counter-weight 33, and adjustment of this counter-weight is possible by means of engagement of the attaching screws 34, through the slot 36. Arm 32 is also attached to a dash pot 37, and its free end extends into a housing 38, for association with the electrical control contacts. The slot 39, in the housing 38, definitely limits swinging movement of the beam 21, during operation of the machine.

Dash pot 37 can be best understood by reference to Fig. 9. It is constructed in such a manner as to afford a considerable amount of damping when the arm 32 is near its lower limit, and to automatically remove substantially all damping when the arm 32 is in intermediate positions or near its upper limit. The dash pot shown in Fig. 9, which makes possible this result, consists of a small cylinder 41, adapted to contain a liquid like ordinary lubricating oil. Slidably extending into the upper end of this cylinder, there is a composite piston rod consisting of a sleeve or tube 42, and an inner rod 43. The upper end of sleeve 42 carries a nut 44, having threaded engagement with the upper portion of the rod 43. Above nut 44 there is a lock nut 46, and above this lock nut the rod 43 is connected to the lower end of a threaded rod 47 (Fig. 5). This rod extends through slot 36, and is adjustably attached to the arm 32, by means of the lock nuts 48.

The lower end of rod 43 (Fig. 9) slidably extends through a small guide 51, which is disposed in the bottom of the cylinder 41. In the region of the guide 51 the cylinder is provided with a portion 41a which is machined to a substantially smaller diameter than the upper and remaining portion of the cylinder 41b. The lower end of sleeve 42 carries a disc 52, and immediately below this disc there is a second disc 53, carried by the rod 43. Disc 53 is provided with apertures 54. Assuming that discs 52 and 53 were in relatively tight contact, openings 54 would be closed. Under such conditions movement of disc 53 within the region of the smaller diameter 41a, would be damped a maximum extent, because all of the displaced liquid would necessarily pass through the clearance about the outer periphery of disc 53, and the adjacent walls of the cylinder. However, by adjusting the spacing between discs 52 and 53, the liquid can be vented an adjustable amount through openings 54, thus adjusting the amount of damping action. When the disc 53 is elevated into the enlarged portion 41b of the cylinder, there is practically no damping action, because of the larger clearance which exists between the periphery of disc 53 and the adjacent walls of the cylinder. The connection of the dash pot to arm 32 is so adjusted, that when the arm 32 is in its lowermost position, disc 53 is within the smaller cylinder portion 41a, that is slightly below the position illustrated in Fig. 9. Therefore the dash pot exerts considerable damping to resist any fluttering of the beam in the proximity of this lower limit. As the beam is raised to intermediate or upper positions, there is substantially no damping, because for such positions the disc 53 is within the enlarged cylinder portion 41b.

The end of the arm 32 which extends into housing 38, carries an electrical contact 56. This contact (which can be termed an upper contact) is adapted to engage and make electrical connection with contact 57, which has a suitable spring mounting to the housing 38. The lower side of the arm 32 also cooperates with a pair of contacts 58 and 59, which also are mounted in housing 38, and which are normally in open position. When arm 32 is swung to its lower limit it engages and presses the upper contact 58 down to close upon the contact 59. Although the circuit diagram of Fig. 6 will not be described at this point, it may be mentioned that the housing 38 also carries an electromagnet 61, in a position so that its magnetic pole is in close proximity with the upper face of magnetic arm 32, when this arm is in raised position. This electromagnet performs the holding or overloading operation and applies a holding or overloading force to the beam to retain contacts 56 and 57 closed, after these contacts have made initial engagement.

It may be explained at this point that opening of the contacts 58 and 59 in the cycle of operation of the machine, serves to disrupt operation of the larger feed drum, leaving however the so-called dribble feed drum in operation. When contacts 56 and 57 are closed the dribble feed drum is stopped, all further supply of material to the weighing hopper is arrested, and material in this hopper is automatically discharged down into the receiver 12.

Referring now to Figs. 3 and 5, the automatic feed means employed includes the two drums 63 and 64, which can be termed respectively the main or large feed drum, and the dribble or small feed drum. Both of these drums are made of suitable metal, such as cast aluminum. Both drums are loosely carried upon a horizontal shaft 66. The side walls 68 of the housing 10 are shown provided with openings 69, through which the ends of the drums 63 and 64 extend. Spring pressed brake shoes 71 can engage the end faces of the drums in order to afford sufficient friction to avoid detrimental back-lash.

The periphery of each drum is provided with a plurality of longitudinally spaced annular ribs 72 (Figs. 3 and 5) and at circumferentially spaced points on these ribs, small extended lugs 73 are provided. All of the lugs 73 are aligned, in order to facilitate the conveyance of material. Extending across the forward side of both drums, there is a bar 74, provided with a plurality of stripping fingers 76. The upper ends of the stripping fingers 76 extend between the ribs 72.

Material being weighed is supplied to the upper sides of the drums 63 and 64, through the chute 77, which is formed in the upper part of the housing 10. The back wall 78 of this chute has its lower end terminating in proximity with the periphery of the drum, while the front wall 79 is provided with a pair of adjustable gates 81 and 82. Extending between the adjacent ends of the drums 63 and 64, there is a partition wall 83, whereby material dropping from the drums 63 and 64 is separately delivered from the housing 10.

The power for operating the machine is supplied by a suitable source such as an electric motor 86 (Fig. 5), which can be provided with a conventional gear box 87, and is shown carried by the motor bracket 88. A chain 89 is shown connecting the drive sprocket 90 on the motor, with a sprocket 91 mounted upon the shaft 66. Incidentally it may be pointed out that this shaft has its end carried in suitable journals 92, supported by the frame of the machine.

The releasable drive connection between shaft 66, and the small drum 64, makes use of a pair of ratchet wheels 93 and 94, with wheel 93 fixed to shaft 66, and wheel 94 journalled upon the hub of wheel 93. A pawl 96 (Fig. 8) has a pivotal mounting with the side of the small drum, and is urged by spring 98, to engage the teeth of ratchet wheel 93. Fixed with respect to the pawl 96 there is an arm 99, the free end of which has a slot 101. This slot engages within a pin 102, provided in the ratchet wheel 94. Normally pawl 96 engages the teeth of wheel 93, so that the drum 64 is driven in unison with shaft 66. However when pawl 96 is locked as by means to be presently described, the camming action or thrust exerted upon pin 102 is sufficient to turn arm 99, and such turning movement is transmitted to pawl 96, in order to swing this pawl to disengaged position. A duplicate type of drive connection is employed for connecting shaft 66 with the large drum 63.

The means employed for locking the ratchet wheel 94, corresponding to the large drum 63, makes use of a trip finger 106 (Fig. 1) having a pivotal connection 107 with the side of the housing. This trip finger is provided with an arm 108, connected to one end of a biasing spring 109. It is also provided with a pin 111, adapted to be engaged by a pivoted latch lever 112. Latch lever 112 is in turn connected to a pull rod 113, extending downwardly from the electric solenoid 114. Thus when the solenoid 114 is energized, latch 112 is lifted, to permit the finger 106 to swing inwardly to engage the teeth of ratchet 94 for the large drum 63. The finger 106 is also provided with a depending arm 116, having a pin and slot connection 117 with a link 118. The other end of this link 118 is connected to an arm or crank 119, which in turn is mounted upon the shaft 121. As will be presently explained this shaft operates a gate for shutting off material from the large feed drum.

A finger 123 serves to engage the ratchet wheel 94 for the small drum (see Fig. 7). This finger also has a pivotal mounting 124 to the side of the housing, and has a laterally extending arm 126, urged downwardly by the tension spring 127. This finger also has another depending arm 128, having a pin and slot connection 129 with the link 131. The other end of this link has a pivotal connection with a crank 132, attached to shaft 133. A tension spring 134 is attached to link 131, and urges the shaft 133 in a clockwise direction, as viewed in Fig. 7. Finger 123 also carries a small mercury contactor 136, the purpose of which will be presently explained. A pin 137 is mounted upon the finger 123, and is engaged by a latch 138. This latch in turn is pivotally mounted upon the side of the housing, and is connected to the pull rod 139, of the electrical solenoid 141. Therefore energizing of solenoid 141 trips the latch 138, thus permitting finger 123 to move forward towards engaged position, to immediately arrest rotation of the small drum 64. At the same time shaft 133 is permitted to rotate in a clockwise direction as viewed in Fig. 7, under the tension of spring 134.

Referring to Fig. 5, two gates 143 and 144 are disposed alongside the front of the large drum, but somewhat below this drum so that material dropping down from the large drum must pass between the gates, when the gates are open. The housing is open below these gates, so that material is free to fall down into the weighing hopper 11. Gate 143 is mounted upon the shaft 121, which as explained with reference to Fig. 1, carries the arm 119. Gate 144 is mounted upon the shaft 107, which is also the shaft to which finger 106 is secured. Thus simultaneously with releasing the finger 106 for the large drum, the gates 143 and 144 are swung towards each other and upwardly, to closed position, to prevent further dropping of material from the large drum into the weighing hopper 11. Similar shorter gates, not shown, are provided immediately in front of and somewhat below the small drum. In this instance however one of these gates is attached to the shaft 133, and the other is attached to the shaft 124 which forms a pivotal mounting for the finger 123.

The weighing hopper 11 is provided with a pair of lower dumping gates 151, which are carried by the shafts 152. The outer end of one of these shafts is attached to an arm 153, while the other shaft is attached to a somewhat similar arm 154. These two arms are cross connected by the link 156. The free end of arm 154 also carries a pin 157, adapted to engage a latch 158. This latch is pivotally mounted upon the side of the hopper 11, and when engaged with the pin 157, serves to retain the gates in closed position, against the weight of material within the hopper. A tension spring 161 is also provided, which urges the gates towards closed position, but which will permit the gates to swing to open position under the weight of material within the hopper, after the latch 158 has been released.

Latch 158 is moved to released position by mechanism making use of a solenoid 162, which has a pull rod 163 connected to a lever 164. Lever 164 has a pivotal mounting 166 with the frame of the machine, and is provided with a small finger 167, carrying an adjustable set screw 168. When lever 164 is swung upwardly for actuation of solenoid 162, set screw 168 engages the free end of latch 158, thus moving this latch to disengaged position with respect to pin 157.

The free end of lever 164 is connected with the lower end of a rod 171, the upper end of which is connected to operate certain mechanism, including a one revolution clutch, for re-cycling the machine. Thus the upper end of this rod is shown engaging the lower side of a finger 172, which has a pivotal mounting 173 on a bracket plate 174. A spring pressed plunger 175 engages the upper side of finger 172, to urge the same in a counter-clockwise direction as viewed in Figs. 1 and 2. Referring particularly to Fig. 2, finger 172 is attached to a depending latch 176, the lower end of which releasably engages with a pin 177, on the arm 178. Arm 178 forms a part of the one revolution clutch, and is pivotally carried by an arm 179, the latter being loosely secured to the hub of a gear 181 (Fig. 3). The ratchet wheel 182 is fixed to the shaft 66, alongside the arm 179, and the teeth of this wheel are adapted to be engaged by a pawl 183. This pawl is spring pressed towards engaged position, and is mounted upon the same pivot pin, as the arm or finger 179. When pin 177 is engaged by the lower end of latch 176, then pawl 183 is retained out of engagement with the teeth of wheel 182. However, when latch 176 is moved to disengaged position, pawl 183 is immediately permitted to snap into engaged position with respect to the teeth on ratchet wheel 182, and thereupon the arm rotates with the ratchet wheel for one revolution, at the end of which pin 177 re-engages with latch 176, thus causing retraction of pawl 183.

Since arm 179 is caused to rotate one revolution after disengagement of latch 176, the same occurs with respect to the gear 181. This gear or pinion engages another gear 186 (Fig. 3), the ratio of diameters being such that the drive ratio is two to one. Gear 186 carries two projecting cam members 187, which are adapted to successively engage a roller 188, carried by the pivotal lever 189. Lever 189 has a pivotal connection 191 to the frame of the machine, and its forward free end is connected to the upper end of a pull rod 192. The lower end of rod 192 has a slidable engagement with a frame part 193, whereby it is free to slide in a vertical direction. Rod 192 is provided with a lug 194, adapted to engage and elevate the finger 108, when the rod 192 is raised. Its lower portion also carries a block 196, which has an inclined cam surface 197. In case the discharge gates 151 of the weighing hopper do not automatically swing back to closed position after the material weighing hopper has discharged, upward movement of block 196 causes the inclined surface 197 to engage the pin 157, thus swinging this pin back into engagement with the latch 158.

The shaft 191 to which arm 189 is attached, extends across the back of the machine, and on the other side of the machine it connects with a similar arm 201. The free end of this arm connects with the upper end of a rod 202, the lower end of which extends through finger 126, and carries a lug 203, whereby when the rod 202 is raised, finger 126 is swung upwardly to move finger 123 back into engagement with latch 138.

In the above description reference has been made to the large drum solenoid 114, the small drum solenoid 141, the solenoid 162 which can be termed a trip solenoid, the holding or so-called overload electromagnet 61, and the various electrical contacts and contactors. Suitable electrical connections for these parts is illustrated in Fig. 6. Lines L1 and L2 connect to a suitable source of current supply, as for example the secondary of a step down transformer. The electromagnet 61 is shown connected in shunt with the terminals of the small drum solenoid 141. Contacts 58 and 59, when closed, supply current from line L1, through solenoid 114, while the small drum solenoid 141 and electromagnet 61 are de-energized. Solenoid 114 is so constructed that when energized it does not trip, but when de-energized it operates in the manner previously described, to disengage latch 112. When contacts 58 and 59 are permitted to open, the circuit through solenoid 114 is interrupted, and therefore the solenoid 114 operates to perform the functions previously described. As contacts 56 and 57 close, a circuit is completed from line L1 through contacts 56 and 57, and solenoid 141, back to the line L2. Thus solenoid 141 is energized, and at the same time the holding solenoid 61 is energized. As previously pointed out energizing of solenoid 141 causes the latch 138 associated with the small drum, to be released. Contactor 136 is of the "Mercoid" type, operated by tilting movement. In normal position illustrated in Figs. 6 and 7, corresponding to engaged position of the latch 138, the contacts are opened. Therefore during such times the solenoid 162 is not energized. However when latch 138 is disengaged and finger 123 moves to engaged position, the contacts are closed and the circuit completed through solenoid 162.

The lower receiving hopper is shown adjustably supported by rods 206 which depend from the frame of the machine. The lower end of this hopper is provided with gates 207, to facilitate guiding material into a carton.

Operation of the machine as a whole can be briefly reviewed as follows: Material such as raisins is supplied at a comparatively constant rate by a suitable conveying means, to the chute 77, in housing 10 (Fig. 5). As the material drops down into chute 77, it falls upon the upper sides of both the large and small drums. Since the drums at this time are in rotation the material is carried forwardly and then dropped downwardly through the two gates 143 and 144, into the weighing hopper 11. Depending upon the speed at which the machine is set, the weighing hopper 11 fills up with material just short of the weight desired. At this time the hopper 11 moves downwardly a slight amount and arm 32 of the balancing beam 21, moves upwardly a sufficient amount to close the contacts 58 and 59. Closing of these contacts immediately results in arresting rotation of the large drum, and in closing the gates 143 and 144, in the manner previously described. It may be noted at this point that false operation of the large drum, is prevented by the damping action of dash pot 37, which causes positive opening of the contacts 58 and 59. As the small drum continues to operate, raisins continue to be discharged at a comparatively slow rate into the weighing hopper 11, until the weight is up to the precise amount desired, at which time the arm 32 of the balancing beam reaches its upper limit to close the contacts 56 and 57. Closing of these contacts immediately disrupts the drive connection to the small drum, thus stopping the small drum, and at the same time the gates which cut off the discharge from the small drum close. Substantially simultaneously with these operations the latch 158 is tripped to permit the discharging gates 151 to swing downwardly and drop the contents into the receiving hopper. About this time the one way revolution clutch is set into operation, and in the course of rotation of gear 186 one-half revolution, one of the cam elements 187 swings lever 189 upwardly, which movement is accompanied by upward swinging movement of the lever 201, on the other side of the machine. Upward swinging of these levers re-cycles the machine; that is, it re-sets the latches 112 and 138, and the latch 158 in connection with the discharge gate, and it also insures proper closing of the discharge gates for the weighing hopper. The large and small drums now commence a new cycle of operation, in which a new batch of material is delivered to the weighing hopper 11, in the manner previously described.

As has been previously pointed out, my machine has many desirable features, not found in machines of the prior art. One of its most valuable features is the accuracy with which it will weigh various materials, such as raisins. Although several factors contribute to successful operation and accuracy, in particular the damping action of the balancing beam only for movements of the beam sufficient to open the contacts 58 and 59, assists in securing a delicate balance before closing of contacts 56 and 57. Also the action of the holding or over-load electromagnet 61, precludes any false operation of the small drum with resulting inaccuracies, in that it retains contacts 56 and 57 closed, while the operations described are being completed.

I claim:

1. In an automatic weighing machine, a weighing hopper having limited movement in a vertical direction, means for applying balancing forces to said hopper, means for feeding material to be weighed to said hopper, said last means including a main feed means and also a dribble feed means, means adapted to be tripped to interrupt supply of material from the main feed means to the hopper, means adapted to operate said last-named means responsive to initial downward movement of the hopper shortly before the same has received the total weight desired, means adapted to be tripped to interrupt supply of material from the dribble feed means to the hopper, an electrical circuit adapted to be closed to energize said last-named means, a pair of electrical contacts included in said electrical circuit and adapted to be closed to close said circuit, means to effect closing of said electrical contacts responsive to further downward movement of said hopper when the same has received the weight desired, and means for damping vertical movements of the hopper only for movements near its uppermost limit, without appreciably damping movements of the hopper for intermediate and lower-most positions of the same.

2. In an automatic weighing machine, a weighing hopper having limited movement in a vertical direction, means for applying balancing forces to said hopper, means for feeding material to be weighed to said hopper, said last means including a main feed means and also a dribble feed means, means adapted to be tripped to interrupt supply of material from the main feed means to the hopper, means adapted to operate said last-named means responsive to initial downward movement of the hopper shortly before the same has received the total weight desired, means adapted to be tripped to interrupt supply of material from the dribble feed means to the hopper, an electrical circuit adapted to be closed to energize said last-named means, a pair of electrical contacts included in said electrical circuit and adapted to be closed to close said circuit, means to effect closing of said electrical contacts responsive to further downward movement of said hopper when the same has received the weight desired, and means for damping vertical movements of the hopper only for movements near its uppermost limit, without appreciably damping movements of the hopper for intermediate and lower-most positions of the same, said last means including a hydraulic dash pot attached to said balancing means.

3. In an automatic weighing machine, a weighing hopper, said hopper being movable in a vertical position between definite upper and lower limits, means for applying balancing forces to said hopper, means for feeding material to be weighed to said hopper, said last means including a main feed means and a dribble feed means, means adapted to be tripped to interrupt supply of material from the main feed means to the hopper, an electrical circuit for actuating said last-named means to trip the same, said circuit including a pair of controlling contacts adapted to make and break electrical connection responsive to movements of the hopper in the proximity of its upper limit, means adapted to be tripped to interrupt supply of material from the dribble feed means to the hopper, means for actuating said last-named means including a second electrical circuit, a pair of electrical contacts included in said second electrical circuit and adapted to be closed to close the electrical circuit, means responsive to downward movement of the hopper to a position adjacent its lower limit for closing said last-named electrical contacts, and electro-magnetic means for applying an over-load force to the balancing means immediately upon initial closing of said last-named contact.

4. In an automatic weighing machine, a weighing hopper, said hopper being movable in a vertical position between definite upper and lower limits, means for applying balancing forces to said hopper, means for feeding material to be weighed to said hopper, said last means including a main feed means and a dribble feed means, means adapted to be tripped to interrupt supply of material from the main feed means to the hopper, an electrical circuit for actuating said last-named means to trip the same, said circuit including a pair of controlling contacts adapted to make and break electrical connection responsive to movements of the hopper in the proximity of its upper limit, means adapted to be tripped to interrupt supply of material from the dribble feed means to the hopper, means for actuating said last-named means including a second electrical circuit, a pair of electrical contacts included in said second electrical circuit and adapted to be closed to close the electrical circuit, means responsive to downward movement of the hopper to a position adjacent its lower limit for closing said last-named electrical contacts, means for applying an overload to said balancing means immediately upon initial closing of said last-named contacts, and means for damping movements of said weighing hopper only for movements in the proximity of said upper limit.

DAVID W. RIPLEY.